United States Patent
Kim et al.

(10) Patent No.: US 11,658,565 B2
(45) Date of Patent: May 23, 2023

(54) APPARATUS FOR CONTROLLING POWER FACTOR CORRECTION CIRCUIT OF CHARGER FOR VEHICLE BATTERY

(71) Applicants: Hyundai Motor Company, Seoul (KR); Kia Corporation, Seoul (KR)

(72) Inventors: Jee Heon Kim, Gyeonggi-do (KR); Hyun Wook Seong, Gyeonggi-do (KR); Sung Uk Park, Busan (KR); Chul Soon Kim, Gyeonggi-do (KR); Hui Sung Jang, Gyeonggi-do (KR); Dong Gyun Woo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/503,936

(22) Filed: Oct. 18, 2021

(65) Prior Publication Data
US 2022/0209652 A1  Jun. 30, 2022

(30) Foreign Application Priority Data
Dec. 28, 2020  (KR) .......................... 10-2020-0184809

(51) Int. Cl.
*H02M 1/42* (2007.01)
*H02M 1/44* (2007.01)
*H02M 1/12* (2006.01)

(52) U.S. Cl.
CPC ............ *H02M 1/4233* (2013.01); *H02M 1/12* (2013.01); *H02M 1/44* (2013.01)

(58) Field of Classification Search
CPC ............ H02M 1/12; H02M 1/14; H02M 1/15; H02M 1/42–4291; H02M 1/44
See application file for complete search history.

(56) References Cited

U.S. PATENT DOCUMENTS

| | | | |
|---|---|---|---|
| 2009/0272735 A1* | 11/2009 | Suenaga | H05B 6/685 219/702 |
| 2010/0097829 A1* | 4/2010 | Uno | H02M 1/44 363/124 |
| 2013/0188407 A1* | 7/2013 | Uguen | H02M 7/04 363/126 |
| 2013/0301317 A1* | 11/2013 | Ishii | H02M 1/4225 363/44 |

(Continued)

FOREIGN PATENT DOCUMENTS

| | | |
|---|---|---|
| KR | 2016-0057524 A | 5/2016 |
| KR | 2018-0078779 A | 7/2018 |

*Primary Examiner* — Fred E Finch, III
(74) *Attorney, Agent, or Firm* — Fox Rothschild LLP

(57) ABSTRACT

An apparatus for controlling a power factor correction circuit of a charger for charging a vehicle batter is configured to correct a power factor of an input AC voltage through switching of a switching element. The apparatus for controlling the power factor correction circuit includes: a phase angle detection unit configured to detect phase angle information of the input AC voltage; and a frequency determination unit configured to synchronize a period in which a preset frequency variation value varies, with a period of the input AC voltage by applying the phase angle information to the frequency variation value, and determine, as a switching frequency of the switching element, a value obtained by applying the synchronized frequency variation value to a preset fundamental frequency value.

6 Claims, 9 Drawing Sheets

(56) References Cited

U.S. PATENT DOCUMENTS

| | | | |
|---|---|---|---|
| 2014/0160805 A1* | 6/2014 | Oh | H02M 1/4258 |
| | | | 363/21.02 |
| 2016/0036319 A1* | 2/2016 | Katsumata | H02M 1/14 |
| | | | 363/126 |
| 2016/0111970 A1* | 4/2016 | Nate | H05B 44/00 |
| | | | 315/201 |
| 2017/0187292 A1* | 6/2017 | Schaemann | G01R 23/02 |
| 2019/0199204 A1* | 6/2019 | Bhandarkar | H02M 3/1563 |

\* cited by examiner

APPARATUS FOR CONTROLLING POWER FACTOR CORRECTION CIRCUIT OF CHARGER FOR VEHICLE BATTERY

CROSS REFERENCE TO RELATED APPLICATION

The present application claims under 35 U.S.C. § 119(a) the benefit of Korean Patent Application No. 10-2020-0184809, filed on Dec. 28, 2020, the entire contents of which are incorporated by reference herein.

BACKGROUND

1. Field of the Disclosure

The present disclosure relates to an apparatus for controlling a power factor correction circuit of a charger for charging a vehicle battery, more particularly, to the apparatus for controlling the power factor correction circuit in which a switching frequency of a switching element inside the power factor correction circuit is periodically varied within a predetermined range, and a period of the varied switching frequency is synchronized with a frequency of an input AC voltage, thereby preventing the input AC current from pulsating.

2. Description of the Related Art

In general, a charger for charging a vehicle battery has a power factor correction circuit provided to improve a power factor. The power factor correction circuit commonly has a topology of a boost converter including an inductor, a diode, and a switching element.

In a conventional power factor correction circuit, there is a problem in that, if a switching frequency of the switching element inside the power factor correction circuit is fixed, substantial electromagnetic noise may occur due to a narrowband peak component. Research has been conducted to improve electromagnetic performance by varying the switching frequency of the switching element at a predetermined period within a predetermined range such that noise of the peak component is distributed over a predetermined band.

However, such an approach has a problem in that, if a variation of the switching frequency is constantly determined, the same interferes with the input AC voltage frequency, and the input AC current inevitably pulsates.

The above descriptions regarding background arts are only for helping understanding of the background of the present disclosure, and are not to be considered by a person skilled in the art as corresponding to already-known prior arts.

SUMMARY

Accordingly, an aspect of the present disclosure is to provide an apparatus for controlling a power factor correction circuit, in which when a switching frequency of a switching element inside the power factor correction circuit is varied at a predetermined period within a predetermined range, a variation period of the switching frequency and the period of the input AC voltage are determined appropriately, thereby preventing the input AC current from pulsating.

In accordance with an aspect of the present disclosure, there is provided an apparatus for controlling a power factor correction circuit configured to correct a power factor of an input AC voltage through switching of a switching element, the apparatus including: a phase angle detection unit configured to detect phase angle information of the input AC voltage; and a frequency determination unit configured to synchronize a period, in which a preset frequency variation value varies, with a period of the input AC voltage by applying the phase angle information to the frequency variation value, and determine, as a switching frequency of the switching element, a value obtained by applying the synchronized frequency variation value to a preset fundamental frequency value.

In an embodiment of the present disclosure, the phase angle detection unit may detect the phase angle information of the input AC voltage by using a dq phase locked loop structure.

In an embodiment of the present disclosure, the phase angle detection unit may include: a dq converter configured to convert the input AC voltage into a dq voltage; a proportional-integral controller configured to output an angular velocity value to converge a q-axis voltage of the dq voltage, obtained by conversion in the dq converter, to zero; and an integrator configured to integrate the output of the proportional-integral controller to derive the phase angle information.

In an embodiment of the present disclosure, the dq converter may convert the input AC voltage and a quadrature component voltage, having a phase difference of 90 degrees from the input AC voltage, into the dq voltage.

In an embodiment of the present disclosure, the q-axis voltage may indicate an error between a phase angle of the input AC voltage and the phase angle information detected by the phase angle detection unit.

In an embodiment of the present disclosure, the frequency determination unit may include: a cosine calculation unit configured to calculate a cosine value of the phase angle information; a multiplier configured to multiply the cosine value, obtained by calculation in the cosine calculator, by the frequency variation value; and a summer configured to sum a result of the multiplication by the multiplier and the fundamental frequency value to derive a switching frequency of the switching element.

In an embodiment of the present disclosure, the frequency determination unit may further include a mux configured to select one of the switching frequency derived from the summer, and the fundamental frequency value, based on an external control signal.

The apparatus for controlling a power factor correction circuit is advantageous in that the variation frequency of the switching element of a switching element inside the power factor correction circuit is determined so as to always follow the period of the input AC voltage such that the input current can be prevented from pulsating, regardless of period variation of the input AC voltage, thereby improving the efficiency of the power factor correction circuit or improving the power factor correction performance.

Advantageous effects obtainable from the present disclosure are not limited to the above-mentioned advantageous effects, and other advantageous effects not mentioned herein could be clearly understood by a person skilled in the art to which the present disclosure pertains.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
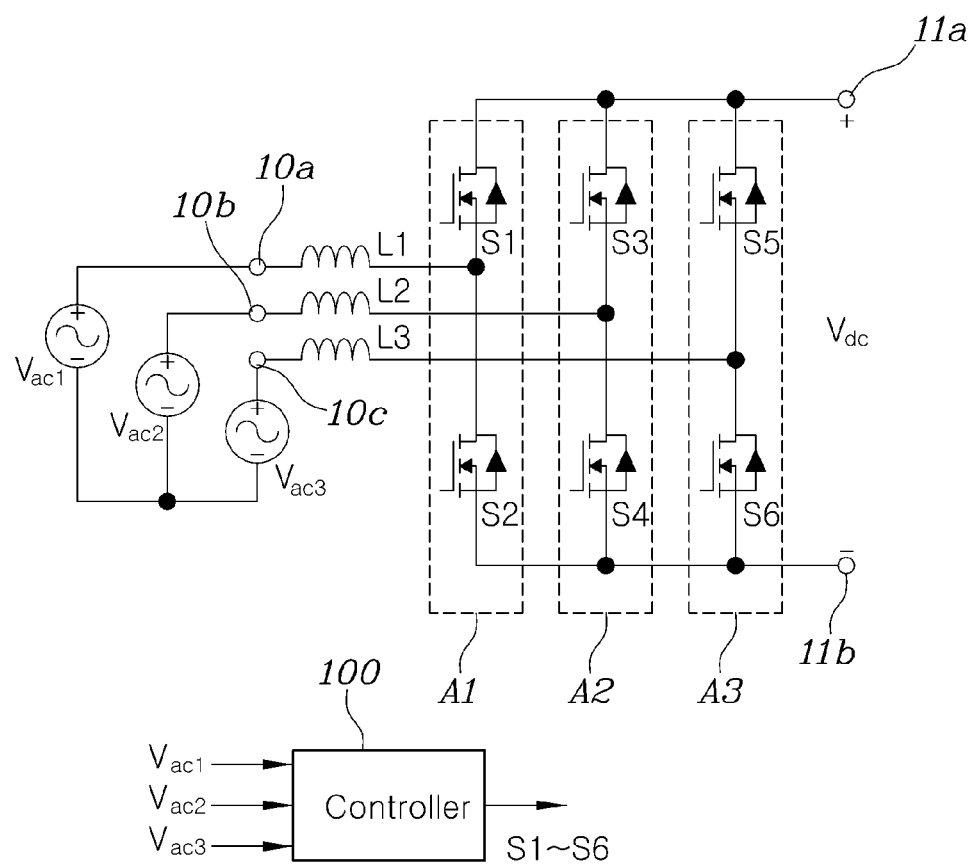
FIGS. 1 and 2 are circuit diagrams illustrating examples of a power factor correction circuit to which a power factor correction circuit control apparatus is applied according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a power factor correction circuit control apparatus according to various embodiments of the present disclosure will be described in detail with reference to the accompanying drawings.

First, an example of a power factor correction circuit to which a power factor correction circuit control apparatus is applied according to various embodiments of the present disclosure will be described.

Figure 2:
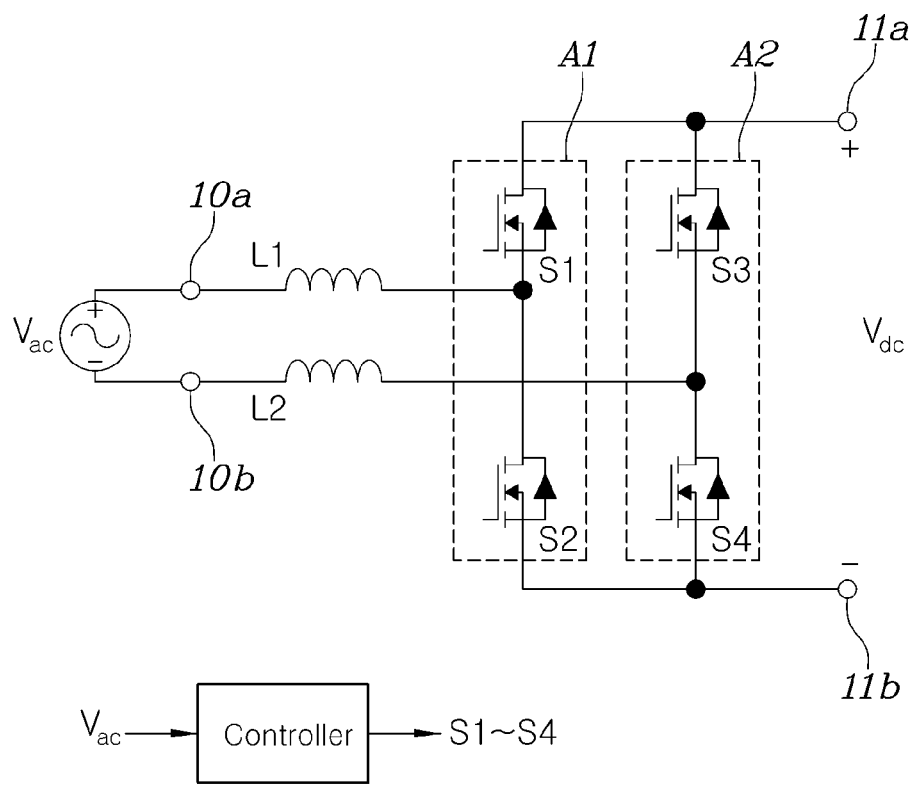

FIGS. 1 and 2 are circuit diagrams illustrating examples of a power factor correction circuit to which a power factor correction circuit control apparatus is applied according to an embodiment of the present disclosure. In particular, the embodiment shown in FIG. 1 is an example of a power factor correction circuit in which three-phase AC power is input, and the embodiment shown in FIG. 2 is an example of a power factor correction circuit in which single-phase AC power is input. The power factor correction circuits shown in FIGS. 1 and 2 are only examples for helping understanding of the present disclosure, and the present disclosure is not limited by the circuit structure of the power factor correction circuit shown in FIGS. 1 and 2.

Referring to FIG. 1, a power factor correction circuit to which a power factor correction circuit control apparatus can be applied according to an embodiment of the present disclosure includes a plurality of legs A1, A2, and A3 and a plurality of inductors L1, L2, and L3. In addition, the plurality of legs A1, A2, and A3 each includes two switching elements connected in series to each other (S1-S2 series connection, S3-S4 series connection, and S5-S6 series connection), and the plurality of legs A1, A2, and A3 are connected in parallel with each other. One terminal of each of the plurality of inductors L1, L2, and L3 is connected to each node through which two switching elements, included in each of the plurality of legs A1, A2, and A3, are interconnected. A controller 100 according to an embodiment of the present disclosure may control the on/off state of the switching element.

The other terminal of each of the plurality of inductors L1, L2, and L3 may be input terminals 10a, 10b, 10c of the power factor correction circuit, and nodes through which the plurality of legs A1, A2, and A3 are connected in parallel to each other may be output terminals 11a and 11b of the power factor correction circuit.

In the embodiment shown in FIG. 1, AC voltages $V_{ac1}$, $V_{ac2}$, and $V_{ac3}$ corresponding to one phase of the three-phase AC voltage may be applied to the input terminals 10a, 10b, and 10c, respectively, and DC voltage $V_{dc}$ may be output between the output terminals 11a and 11b.

Although not shown, a capacitor for configuring a DC voltage $V_{dc}$ may be connected between the output terminals 11a and 11b, and a DC/DC converter configured to convert the DC voltage ($V_{dc}$) of the output terminals 11a and 11b to a voltage having a desired magnitude may be provided at the rear end of the output terminals 11a and 11b. In a case of a charger provided in a vehicle, a DC/DC converter is connected to a battery and may convert the magnitude of the DC voltage $V_{dc}$ into the magnitude of a battery charging voltage.

Referring to FIG. 2, a power factor correction circuit, to which a power factor correction circuit control apparatus can be applied according to an embodiment of the present disclosure, may include a plurality of legs A1 and A2 each including two switching elements connected in series to each other (S1-S2 series connection and S3-S4 series connection), the plurality of legs A1 and A2 being connected in parallel with each other; and a plurality of inductors L1 and L2, one terminal of each of the plurality of inductors L1 and L2 being connected to each node through which two switching elements included in each of the plurality of legs A1 and A2 are interconnected. The controller 100 according to an embodiment of the present disclosure may control the on/off state of the switching element.

The other terminal of each of the plurality of inductors L1 and L2 may be input terminals 10a and 10b of the power factor correction circuit, and nodes through which the plurality of legs A1 and A2 are connected in parallel with each other may be the output terminals 11a and 11b of the power factor correction circuit.

In the embodiment shown in FIG. 2, a single-phase AC voltage Vac may be applied between the AC input terminals 10a and 10b. The DC voltage $V_{dc}$ may be output between the output terminals 11a and 11b.

As in the example shown in FIG. 1, although not shown, a capacitor for configuring a DC voltage $V_{dc}$ may be connected between the output terminals 11a and 11b, and a DC/DC converter configured to convert the DC voltage $V_{dc}$ of the output terminals 11a and 11b into a voltage having a desired magnitude may be provided at the rear end of the output terminals 11a and 11b. In a case of a charger provided in a vehicle, a DC/DC converter is connected to a battery and may convert the magnitude of the DC voltage $V_{dc}$ into a magnitude of a battery charging voltage.

Figure 3:
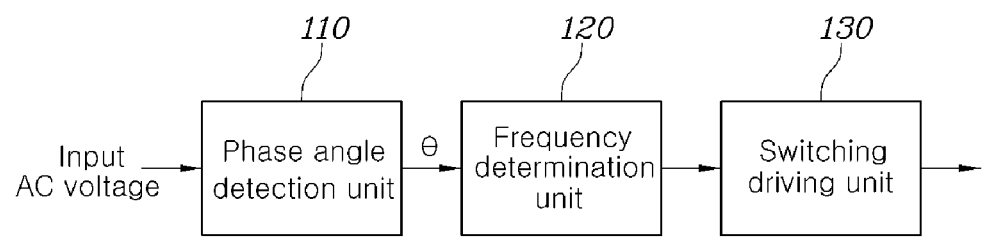
FIG. 3 is a block configuration diagram of a power factor correction circuit control apparatus according to an embodiment of the present disclosure.

FIG. 3 is a block configuration diagram of a power factor correction circuit control apparatus according to an embodiment of the present disclosure.

Referring to FIG. 3, a power factor correction circuit control apparatus according to an embodiment of the present disclosure may include: a phase angle detection unit 110 configured to detect phase angle information of input AC voltages $V_{ac1}$, $V_{ac2}$, $V_{ac3}$, or $V_{ac}$; a frequency determination unit 120 configured to synchronize a period, in which a frequency variation value varies, with a period of the input AC voltages $V_{ac1}$, $V_{ac2}$, $V_{ac3}$, or $V_{ac}$ by applying the detected phase angle information to a preset frequency variation value, and determine, as a switching frequency of switching elements SQ1-S6 or S1-S4, a value obtained by applying the synchronized frequency variation value to a preset fundamental frequency value; and a switching driving unit 130 configured to generate a control signal for determining on/off of the switching elements S1-S6 or S1-S4 according to the determined switching frequency. The phase angle detection unit 110, the frequency determination unit 120, and the switching driving unit 130 may be embodied by one or more controllers.

Figure 4:
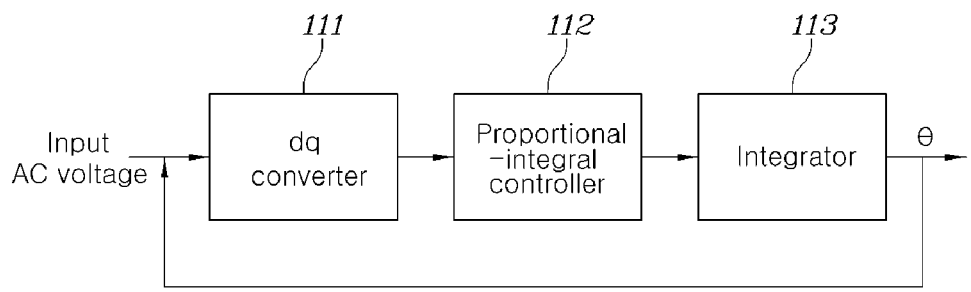
FIG. 4 is a block configuration diagram illustrating in more detail a phase angle detection unit of a power factor correction circuit control apparatus according to an embodiment of the present disclosure.

FIG. 4 is a block configuration diagram illustrating in more detail a phase angle detection unit of a power factor correction circuit control apparatus according to an embodiment of the present disclosure.

A phase angle detection unit 110 is a circuit that basically detects a phase angle θ of input AC voltages $V_{ac1}$, $V_{ac2}$, $V_{ac3}$, or $V_{ac}$. A method for detecting the phase angle of an AC signal may employ several techniques, known in the related technical field, such as a method for detecting a voltage waveform and dividing the voltage waveform by the magnitude of an AC signal, or a method for creating a sine function by detecting a zero crossing point of the AC signal. In particular, in an embodiment of the present disclosure, the phase angle detection unit 110 may employ a dq phase loop lock (PLL) structure as shown in FIG. 4.

Referring to FIG. 4, the phase angle detection unit 110 employing the dq PLL structure may include a dq converter 111 configured to convert a single-phase or a multi-phase input AC voltage into a dq voltage; a proportional-integral (PI) controller 112 for outputting an angular velocity value to converge a q-axis voltage of the dq voltage, which is obtained by conversion in the dq converter 111, to zero; and an integrator 113 for integrating the output of the proportional-integral controller 112 to derive a phase angle.

In particular, the dq converter 111 may convert an input AC voltage corresponding to a grid voltage into a dq voltage. When the input AC voltage is a single phase voltage, the dq converter 111 may generate a quadrature component having a phase difference of 90 degrees from the input AC voltage by using a delay or the like, and then perform dq conversion for the quadrature component. When the input AC voltage is a three-phase voltage, the dq converter may generate an AC voltage of one phase among three phases and a quadrature component having a phase difference of 90 degrees therefrom, by using a difference between phase voltages of the three phases, and then perform dq conversion thereon.

The dq converter 111 may set a single-phase AC voltage or a voltage of one phase and a voltage of a quadrature component having a phase difference of 90 degrees therefrom, as voltages $V_\alpha$ and $V_\beta$ of α and β values, respectively, and may perform dq conversion thereon using the following αβ-dq conversion formula known in the related technical field.

$$\begin{bmatrix} V_d \\ V_q \end{bmatrix} = \begin{bmatrix} \cos\theta & \sin\theta \\ -\sin\theta & \cos\theta \end{bmatrix} \begin{bmatrix} V_\alpha \\ V_\beta \end{bmatrix} \quad \text{[Equation 1]}$$

In Equation 1, θ may be a value obtained by feeding back the phase angle detected by the phase angle detection unit 110. When α value voltage $V_\alpha$ corresponding to a single-phase AC voltage or a voltage of one-phase is assumed to be cos θ̂ and β value voltage $V_\beta$ corresponding to a quadrature component having a phase difference of 90 degrees therefrom is assumed to be sin θ̂, q-axis voltage $V_q$ may be obtained by the following Equation 2.

$$V_q = -\sin\theta \cos\hat{\theta} + \sin\hat{\theta} \cos\theta \quad \text{[Equation 2]}$$

Here, the right side of Equation 2 may be summarized as Equation 3 below according to the sine cosine formula.

$$V_q = \sin(\hat{\theta}-\theta) \approx \hat{\theta}-\theta \quad \text{[Equation 3]}$$

As shown in Equation 3, the q-axis voltage derived by dq conversion corresponds to an error between a phase angle θ̂ of the input AC voltage and a phase angle θ detected by the phase angle detection unit 110. This means that, if a detected phase angle θ makes the above value zero, an accurate phase angle of the input AC voltage is detected.

Therefore, the proportional-integral controller 112 may perform proportional-integral control to converge the q-axis voltage, which is obtained by conversion in the dq converter 111 and output, to zero, and may output angular velocity information corresponding to a result of the proportional-integral control.

The integrator 113 may integrate the angular velocity information, which is output from the proportional-integral controller 112, to derive a phase angle at which the q-axis voltage can be converged to zero.

Additionally, the phase angle detection unit 110 may additionally include a limiter or a configuration that performs anti-windup control to limit the range of values output from respective elements. These additional configurations are not directly related to the main idea of the present disclosure and can be easily inferred by a person skilled in the art within a range known in the technical field to which the present disclosure belongs, and thus further detailed descriptions will be omitted.

Figure 5:
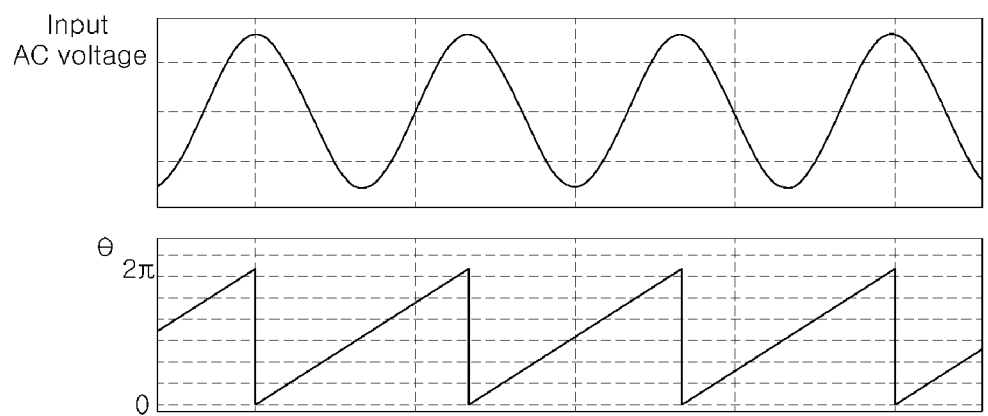
FIG. 5 is a graph illustrating a result of phase angle detection by a phase angle detection unit of a power factor correction circuit control apparatus according to an embodiment of the present disclosure.

FIG. 5 is a graph illustrating a result of phase angle detection by a phase angle detection unit of a power factor correction circuit control apparatus according to an embodiment of the present disclosure.

As shown in FIG. 5, a phase angle according to a phase change of the input AC voltage may be detected by the phase angle detection unit 110 of the dq PLL structure as described above. In particular, in the above-described example, since α value voltage $V_\alpha$ that serves as a reference is determined in the form of a cosine function, when the input AC voltage has a peak value as shown in FIG. 5, it may be identified that the phase angle is determined as 0 degrees (or 360 degrees).

Figure 6:
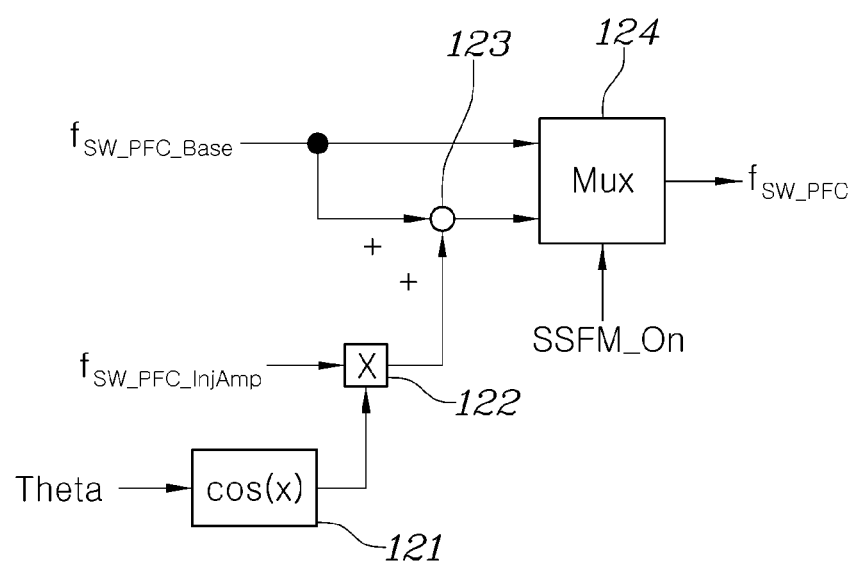
FIG. 6 is a block configuration diagram illustrating in more detail a frequency determination unit of a power factor correction circuit control apparatus according to an embodiment of the present disclosure.

FIG. 6 is a block configuration diagram illustrating in more detail a frequency determination unit of a power factor correction circuit control apparatus according to an embodiment of the present disclosure.

Referring to FIG. 6, the frequency determination unit 120 may include a cosine calculation unit 121 configured to calculate a cosine value of the detected phase angle; a multiplier 122 configured to multiply the cosine value, obtained by calculation in the cosine calculation unit 121 by a preset frequency variation value $f_{SW\_PFC\_OnjAmp}$; a summer 123 configured to sum a result of the multiplication by the multiplier 122 and a preset fundamental frequency value $f_{SW\_PFC\_Base}$; and a mux 124 configured to selectively output one of the fundamental frequency value $f_{SW\_PFC\_Base}$ and a result of the summation by the summer 123.

The preset fundamental frequency value $f_{SW\_PFC\_Base}$ is a value corresponding to a fixed switching frequency of a switching element in the power factor correction circuit and may be appropriately predetermined according to system specifications and the like. When performing frequency spreading (variation) control, the fundamental frequency value $f_{SW\_PFC\_Base}$ may be a center frequency of a range in which the frequency is spread.

The preset frequency variation value $f_{SW\_PFC\_OnjAmp}$ is a preset value of a width for spreading (varying) the fundamental frequency value $f_{SW\_PFC\_Base}$, and the switching frequency of the switching element may be varied within a range in which the frequency variation value is added or subtracted to or from the fundamental frequency value $f_{SW\_PFC\_Base}$.

For example, if the fundamental frequency value $f_{SW\_PFC\_Base}$ is 100 kHz and the frequency variation value $f_{SW\_PFC\_OnjAmp}$ is 5 kHz, the frequency of the switching element that controls the frequency spread (variation) of the switching element in the power factor correction circuit may vary in a predetermine period within the range of 95 to 105 kHz.

According to various embodiments of the present disclosure, a period, in which the frequency of the switching element varies, is synchronized with a grid AC voltage, that is, an input AC voltage. That is, in the above example, according to the various embodiments of the present disclosure, a period, in which the switching frequency of the switching element decreases from 100 kHz to 95 kHz, increases to 105 kHz, and then returns to 100 kHz again, may be synchronized with the input AC voltage.

To this end, the frequency determination unit 120 according to an embodiment of the present disclosure obtains a cosine value of the phase angle of the input AC voltage, detected by the phase angle detection unit 110, and multiplies the cosine value of the phase angle by the frequency variation value $f_{SW\_PFC\_OnjAmp}$. That is, the output of the multiplier 122 may be a cosine function having a magnitude of the frequency variation value, and the cosine function may be a function having the same phase as that of the input AC voltage. That is, the multiplier 122 may change the frequency variation value $fS_{W\_PFC\_OnjAmp}$ to be synchronized with the period of the input AC voltage.

The output of the multiplier 122 is summed to a preset fundamental frequency value $f_{SW\_PFC\_Base}$ by the summer 123, and thus the switching frequency of the switching element may be changed within a range determined by the frequency variation value $f_{SW\_PFC\_OnjAmp}$ in a state of being synchronized with the period of the input AC voltage.

The mux 124 may select and output one of the fundamental frequency value $f_{SW\_PFC\_Base}$ and a switching frequency value, a frequency of which varies in synchronization with the period of the input AC voltage, based on an external control signal SSFM_On that determines whether to perform frequency variation control. The output of the mux 124 may be determined as the switching frequency $f_{SW\_PFC}$ of the switching element in the power factor correction circuit and may be output to the switching driving unit 130.

The switching driver 130 is a circuit configured to generate a control signal for controlling on/off switching of switching elements S1-S6 or S1-S4 in the power factor correction circuit according to the switching frequency $f_{SW\_PFC}$ determined by the frequency determination unit 120. For example, the switching driving unit 130 may be implemented with a known gate driving circuit, which generates a saw tooth carrier signal corresponding to the switching frequency $f_{SW\_PFC}$, generates a DC reference signal for determining a switching duty, and then generates an on/off general signal by comparing the carrier signal and the reference signal.

Figure 7:
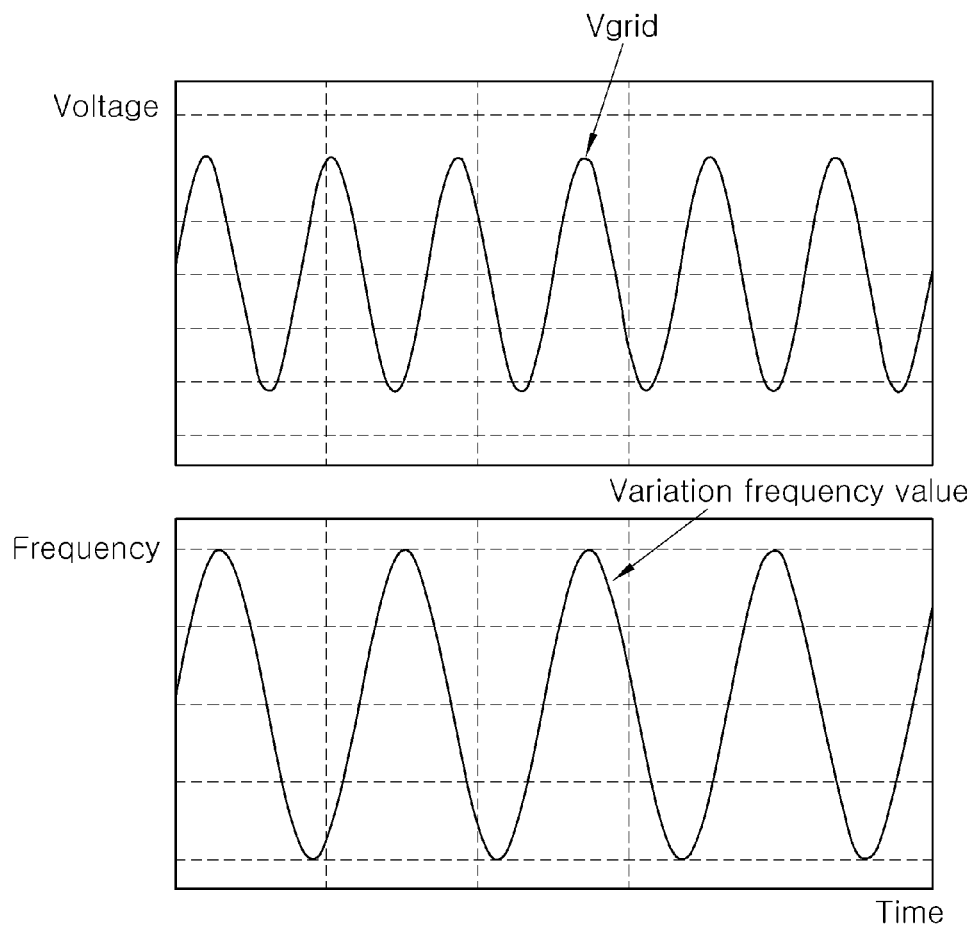
FIGS. 7 and 8 are graphs illustrating the period of an input voltage and the period of a switching frequency variation as a comparison between when frequency variation control is not performed by a power factor correction circuit control apparatus according to an embodiment of the present disclosure and when the same is performed thereby, respectively.
Figure 8:
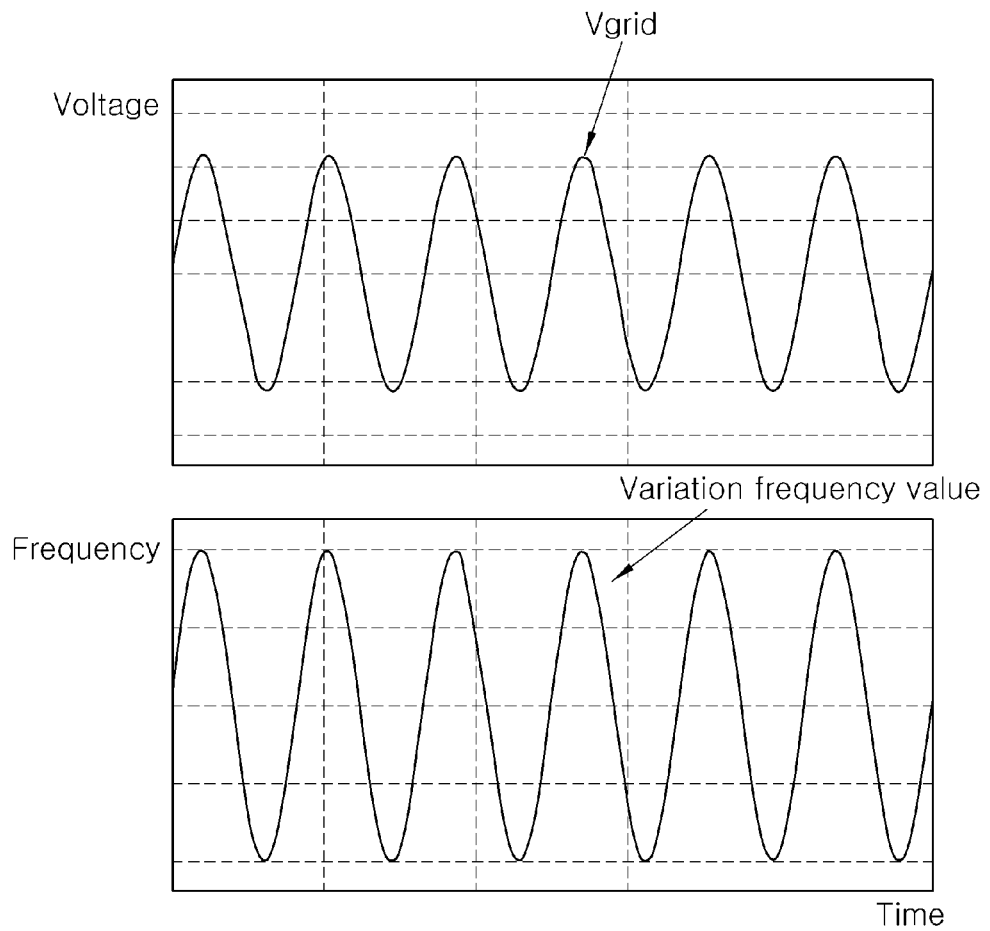
Figure 9:
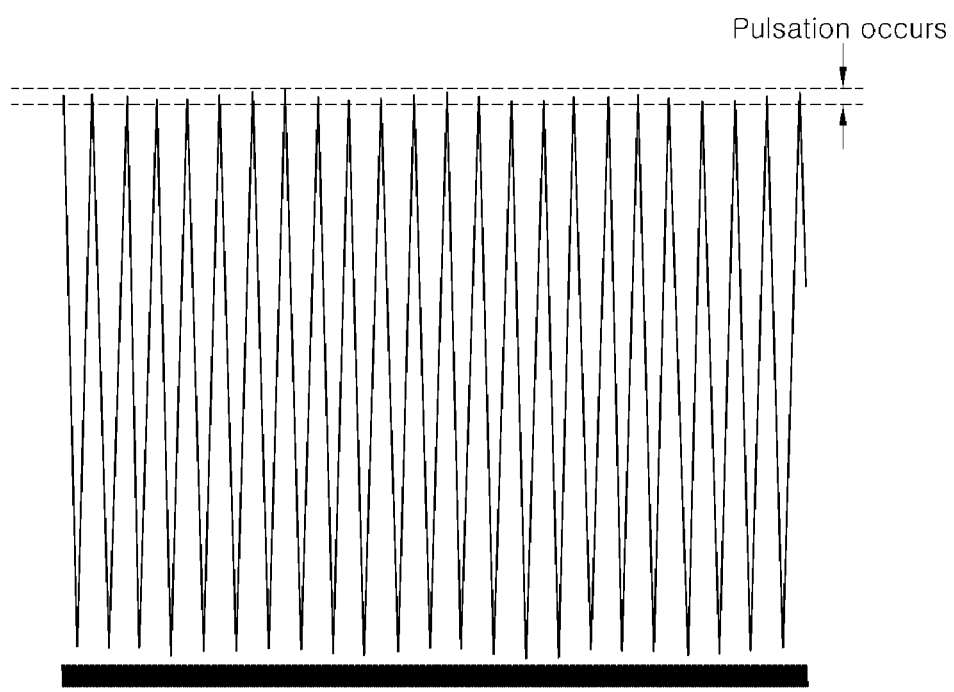
FIGS. 9 and 10 illustrate a difference in the input current quality as a comparison between when frequency variation control is not performed by a power factor correction circuit control apparatus according to an embodiment of the present disclosure and when the same is performed thereby, respectively.
Figure 10:
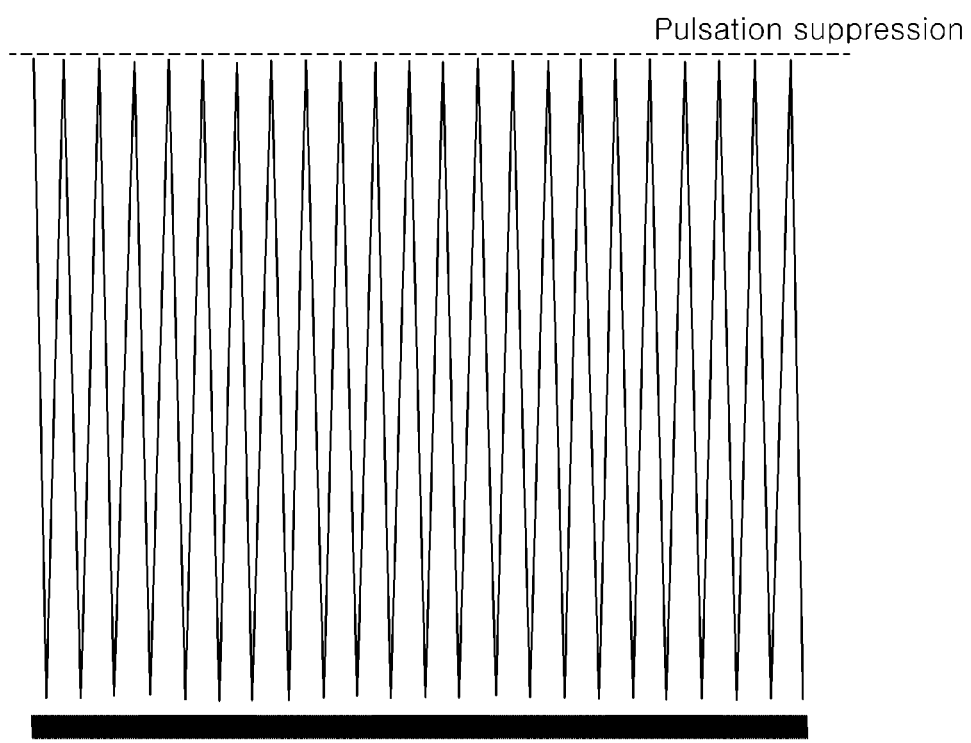

FIGS. 7 and 8 are graphs illustrating the period of an input voltage and the period of a switching frequency variation as a comparison between when frequency variation control is not performed by a power factor correction circuit control apparatus according to an embodiment of the present disclosure and when the same is performed thereby, respectively. FIGS. 9 and 10 illustrate a difference in the input current quality as a comparison between when frequency variation control is not performed by a power factor correction circuit control apparatus according to an embodiment of the present disclosure and when the same is performed thereby, respectively.

As shown in FIG. 7, when frequency variation control is not performed by a power factor correction circuit control apparatus according to an embodiment of the present disclosure, the frequency variation period of the voltage variation frequency value maintains a preset value. When the variation period of the variation frequency value is set differently from that of the input AC voltage $V_{grid}$, the input current of the power factor correction circuit pulsates, as shown in FIG. 9, due to interference between the period of the input AC voltage and the frequency variation period of the varying frequency value. In particular, even if the variation period of the variation frequency value is set to be the same as that of the input AC voltage, current pulsation inevitably occurs when the period of the input AC voltage varies during vehicle charging.

On the other hand, when the frequency variation control is performed by a power factor correction circuit control apparatus according to an embodiment of the present disclosure, as shown in FIG. 8, the frequency variation period of the voltage variation frequency value is determined to always follow the period of the input AC voltage. Therefore, it is possible to suppress the pulsation of the input current at all times, as shown in FIG. 10, regardless of the period variation of the input AC voltage, so as to improve the efficiency or power factor correction performance of the power factor correction circuit.

Although specific embodiments of the present disclosure have been described in the detailed description above, it would be obvious to a person skilled in the art that the present disclosure can be variously improved and changed within the scope of the claims.

What is claimed is:

1. An apparatus for controlling a power factor correction circuit of a charger for charging a vehicle battery, the apparatus configured to correct a power factor of an input AC voltage through switching of a switching element, the apparatus comprising:
    a phase angle detection unit configured to detect phase angle information of the input AC voltage; and
    a frequency determination unit configured to:
        synchronize a period, in which a preset frequency variation value varies, with a period of the input AC voltage by applying the phase angle information to the frequency variation value; and
        determine, as a switching frequency of the switching element, a value obtained by applying the synchronized frequency variation value to a preset fundamental frequency value;
    wherein the phase angle detection unit comprises:
        a dq converter configured to convert the input AC voltage into a dq voltage;
        a proportional-integral controller configured to output an angular velocity value to converge a q-axis voltage of the dq voltage, obtained by conversion in the dq converter, to zero; and
        an integrator configured to integrate the output of the proportional-integral controller to derive the phase angle information.

2. The apparatus of claim 1, wherein the phase angle detection unit is configured to detect the phase angle information of the input AC voltage by using a dq phase locked loop structure.

3. The apparatus of claim 1, wherein the dq converter converts the input AC voltage and a quadrature component voltage, having a phase difference of 90 degrees from the input AC voltage, into the dq voltage.

4. The apparatus of claim 1, wherein the q-axis voltage indicates an error between a phase angle of the input AC voltage and the phase angle information detected by the phase angle detection unit.

5. The apparatus of claim 1, wherein the frequency determination unit comprises:
    a cosine calculation unit configured to calculate a cosine value of the phase angle information;
    a multiplier configured to multiply the cosine value, obtained by calculation in the cosine calculator, by the frequency variation value; and
    a summer configured to sum a result of the multiplication by the multiplier and the fundamental frequency value to derive a switching frequency of the switching element.

6. The apparatus of claim 5, wherein the frequency determination unit further comprises a mux configured to select one of the switching frequency derived from the summer, and the fundamental frequency value, based on an external control signal.

* * * * *